(12) United States Patent
Khubani

(10) Patent No.: US 12,122,686 B2
(45) Date of Patent: Oct. 22, 2024

(54) HOSE AND HOSE ACCESSORIES HAVING CHARCOAL-INFUSED WATER CONTACTING SURFACE

(71) Applicant: Health Bloom, LLC, Miami Beach, FL (US)

(72) Inventor: Ajit Khubani, Saddle River, NJ (US)

(73) Assignee: Health Bloom, LLC, Miami Beach, FL (US)

( * ) Notice: Subject to any disclaimer, the term of this patent is extended or adjusted under 35 U.S.C. 154(b) by 0 days.

(21) Appl. No.: 17/468,562

(22) Filed: Sep. 7, 2021

(65) Prior Publication Data
US 2022/0073376 A1 Mar. 10, 2022

Related U.S. Application Data

(60) Provisional application No. 63/074,979, filed on Sep. 4, 2020.

(51) Int. Cl.
*C02F 1/28* (2023.01)
*F16L 11/12* (2006.01)

(52) U.S. Cl.
CPC .............. *C02F 1/283* (2013.01); *F16L 11/12* (2013.01)

(58) Field of Classification Search
CPC ....... C02F 1/283; C02F 2307/06; F16L 11/12; F16L 33/225
See application file for complete search history.

(56) References Cited

U.S. PATENT DOCUMENTS

| | | | | |
|---|---|---|---|---|
| 5,082,568 A | * | 1/1992 | Holler | B01J 47/024 |
| | | | | 210/679 |
| 5,601,710 A | * | 2/1997 | Yoon | B01D 35/153 |
| | | | | 210/264 |
| 2017/0158527 A1 | * | 6/2017 | Kawai | C02F 1/44 |

OTHER PUBLICATIONS

Waterdrop ("Garden hose filter with flexible hose protector"), Internet Archive, Aug. 13, 2020.*

* cited by examiner

*Primary Examiner* — Benjamin L Lebron
(74) *Attorney, Agent, or Firm* — Pryor Cashman LLP

(57) ABSTRACT

Activated charcoal is infused in the material of at least a portion of one component amongst a hose accessory (e.g., a nozzle), an inner flow conductor (e.g., tube) of a hose, and a hose connector for connecting the hose to the accessory or a water source, to convey, to the component, an adsorption property to adsorb undesirable components in water contacting the component.

8 Claims, 16 Drawing Sheets

HOSE AND HOSE ACCESSORIES HAVING CHARCOAL-INFUSED WATER CONTACTING SURFACE

RELATED APPLICATION

This application claims the benefit under 35 U.S.C. § 119(e) to U.S. Provisional Application Ser. No. 63/074,979, filed Sep. 4, 2020, entitled "HOSE AND HOSE ACCESSORIES HAVING CHARCOAL-INFUSED WATER CONTACTING SURFACE", which is herein incorporated by reference in its entirety.

TECHNICAL FIELD

This disclosure relates to water hoses and hose accessories that have one or more water-contacting surfaces, and more specifically such water hoses and hose accessories that are infused with activated charcoal, to promote wellness of the consumer of the water.

BACKGROUND

Hoses are popular tools for delivering fluids from one place to another, particularly outdoors (or at least external to an abode). Garden hoses in particular are popular with homeowners and tradespersons for providing water from spigots to where it is needed.

SUMMARY

Water intake is a necessary part of human wellness, as well as wellness for many pets. Since commencement of the industrial age, there has been a growing consciousness that the purity of water we consume can greatly affect our wellness. In more recent times, as the instances of parts of our population having been affected by pollution to our water supply increased, home use of water purifiers have gained popularity. While such water purifiers have gained popularity and sophistication, the general cost of use of water purifiers has also increased. Further, such water purifiers are typically designed specifically for indoor use, such as inside a home.

Although common sense may suggest that one should not drink the water that flows out of hoses, we often ignore the risks of drinking water from the hose and/or the risks of our pets drinking such water. Risks to the wellness of the consumer who drinks water dispensed through a water hose can be reduced by infusing the material forming a water-contacting surface, or at least a portion thereof, in the fluid path with activated charcoal. Such material infused with activated charcoal would have an adsorption property to adsorb undesirable components in the water flowing substantially tangentially to the water-contacting surface.

In one embodiment, the water-contacting surface of the nozzle or nozzle section which is furthest downstream in the fluid path before it is ejected from the nozzle is formed of such material infused with activated charcoal powder such that the water-contacting surface would have the adsorption property to adsorb undesirable components in the water flowing substantially tangentially to the water-contacting surface.

In addition or alternatively, another nozzle section or a hose connector (or section thereof) which couples the hose to the nozzle can be formed of such material infused with activated charcoal powder such that the water-contacting surface of such other nozzle section or hose connector (or section thereof) would have the adsorption property to adsorb undesirable components in the water flowing substantially tangentially to the water-contacting surface.

In addition or alternatively, an inner fluid conductor (e.g., inner tube) via which water flows through the hose can be formed of such material infused with activated charcoal powder such that the water-contacting surface of the inner fluid conductor would have the adsorption property to adsorb undesirable components in the water flowing substantially tangentially to the water-contacting surface.

In one embodiment, a water hose comprises a fluid conductor having an inner water-contacting surface along which water flows in a flow direction substantially tangential to said surface and a hose connector to fluidly connect the fluid conductor to a nozzle through which the water is ejected, the hose connector and the nozzle each having at least one water-contacting surface. At least one of (i) the inner water-contacting surface of the fluid conductor, (ii) the water-contacting surface of the hose connector, and (iii) the water-contacting surface of the nozzle is infused with activated charcoal to convey, to the charcoal infused water-contacting surface, an adsorption property to adsorb one or more undesirable components which are not conducive to wellness of a consumer who drinks the water containing said undesirable component.

BRIEF DESCRIPTION OF THE DRAWINGS

The aforementioned and other aspects, features and advantages can be more readily understood from the following detailed description with reference to the accompanying drawings, wherein.

DETAILED DESCRIPTION

Figure 1:
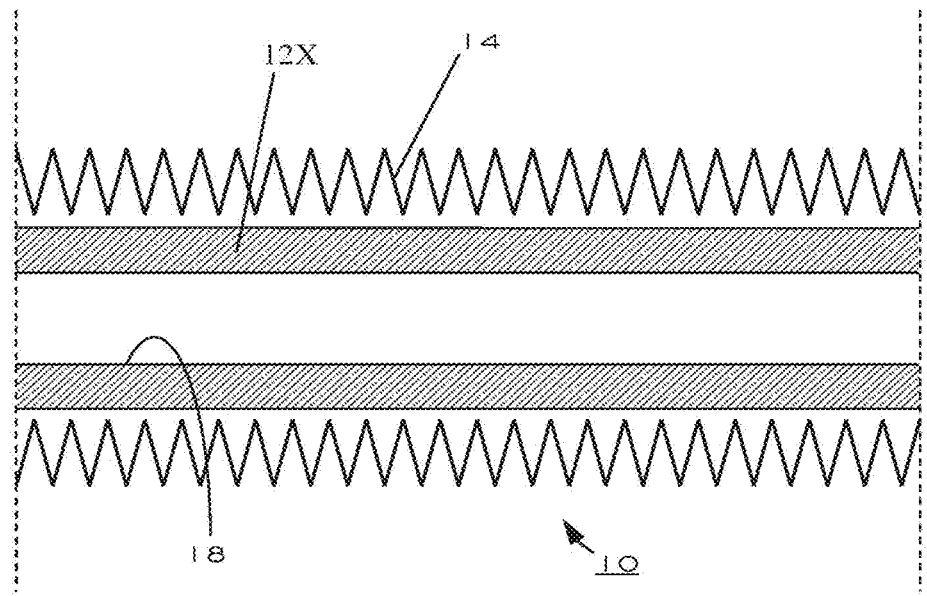
FIG. 1 is a cross sectional view of a hose in a retracted state according to an example of an embodiment of the present disclosure.

Clean drinking water is vital to our wellness. Water plays an important role in various biological processes needed for maintaining a healthy body, from digestion to waste removal.

Drinking water is not just made of hydrogen and oxygen, but typically also includes additives, impurities and even nasty chemicals (for example, toxins that find their way into waterways, and subsequently our drinking water) in addition to desirable minerals which make up the composition of the drinking water.

Activated charcoal, which is normally in the form of fine powder (for example, obtained from materials such as bone char, coconut shells, peat, petroleum coke, coal, olive pits, sawdust, among others), is sometimes used in water filters. For use in water filters, the activated charcoal is typically pressed into a solid block or processed to form loose beads. In use, while water supplied into one end of such water filter passes through the water filter including such activated charcoal structure, the activated charcoal traps unhealthy organic compounds, while allowing the water to pass through the other end of the filter.

However, activated charcoal unfortunately is not a cure-all, as it does not remove all pathogens or microorganisms, so charcoal is often used in conjunction with another filter. Further, the cost to consumers of a water filter as a whole (although the contribution of the charcoal to the cost is relatively minor) is unfortunately rather high.

On the other hand, activated charcoal nevertheless can be employed in a drinking water delivery system, to contribute to the goal of human wellness, without relying on the activated charcoal to be a cure-all filter through which water is passed. Applicant recognized that the surface adsorption properties of activated charcoal powder still can contribute to the trapping of undesirable components (and thereby reduce a content thereof) in drinking water, due to the adsorption property which is effective even when the water merely contacts the surface of the activated surface. The term "undesirable components" is used herein to refer to additives, impurities, toxins and other nasty chemicals, individually or collectively or subsets thereof, which pose a risk to the wellness of the consumer who drinks water including such undesirable components.

In an example of an activation process, carbon-rich materials such as wood are burnt at very high temperatures to obtain charcoal (a nearly pure form of carbon), and the charcoal is passed through a variety of chemical processes in order to "activate" it, which may include treatment with oxygen, steam, certain acids, and carbon dioxide among other chemicals. Activation processes remove impurities and produces fine porous granules, while creating numerous surface holes and crevices on charcoal particles (more specifically, number of surface pores increased and size of pores decreased, while the overall surface area is increased tremendously). The unique porous surface structure of activated charcoal makes it suitable for surface binding (i.e.

adsorption) which, in contrast to absorption, binds impurities chemically, rather than physically. Activated charcoal is natural and can be effective, via surface adsorption, at removing many toxins and chemical molecules, such as volatile organic compounds and chlorine, without stripping the water of salts and minerals (e.g., calcium, magnesium, iron, etc.). The structure of activated charcoal, such as more specifically its negative electrical charge, permits it to pull positively charged molecules, such as toxins and gases. These molecules are then trapped inside the intricate meshwork of crevices and holes in the activated charcoal.

Activated charcoal adsorbs not only chemicals such as chlorine (which is added to drinking water captured in reservoirs, to kill bacteria and pathogens found in the reservoirs), but they are also highly effective at removing odors as well, making your drinking water much more palatable.

Although not necessarily supported by empirical data, it has been suggested that activated charcoal with its toxin-adsorbing properties can convey antiviral, antibacterial and antifungal properties.

Examples will now be discussed with reference to the drawings, so that the aforementioned and other aspects, features and advantages can be more readily understood.

Elongatable and retractable hoses are described herein, as examples, for discussion purposes, of inventive subject matter. Specific terminology is employed in describing examples and exemplary embodiments. However, the disclosure of this patent specification is not intended to be limited to elongatable and retractable hoses, nor to the specific terminology so selected and it is to be understood that each specific element includes all technical equivalents that operate in a similar manner.

Figure 2:
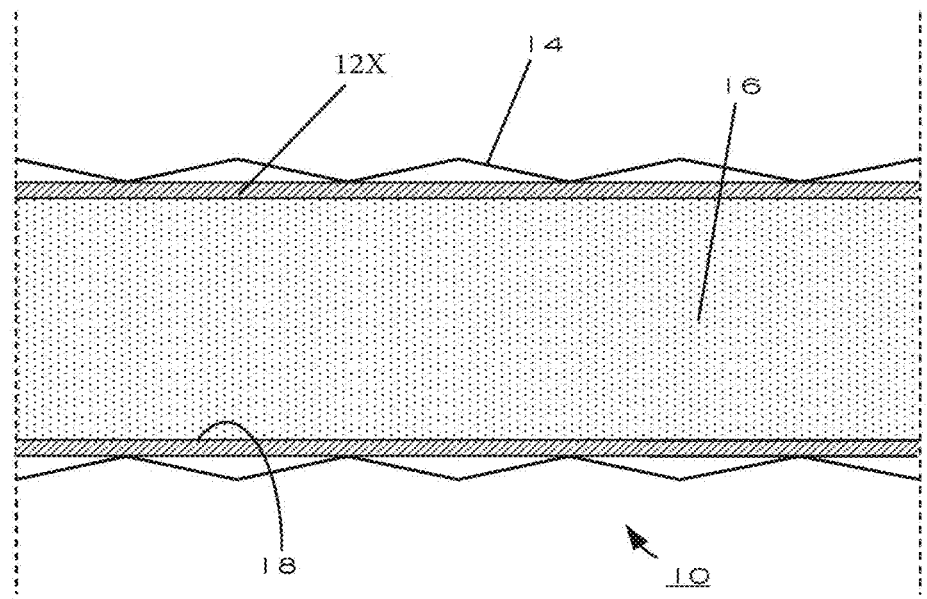
FIG. 2 is a cross sectional view of the hose in an elongated state according to such example.

Hose 10 constructed according to FIG. 1 may include an inner fluid conductor 12X and an outer jacket 14. FIG. 1 shows a cross sectional view of the hose 10 in a retracted state, and FIG. 2 shows the same hose 10 in an elongated state, pressurized with fluid 16.

Figure 14:
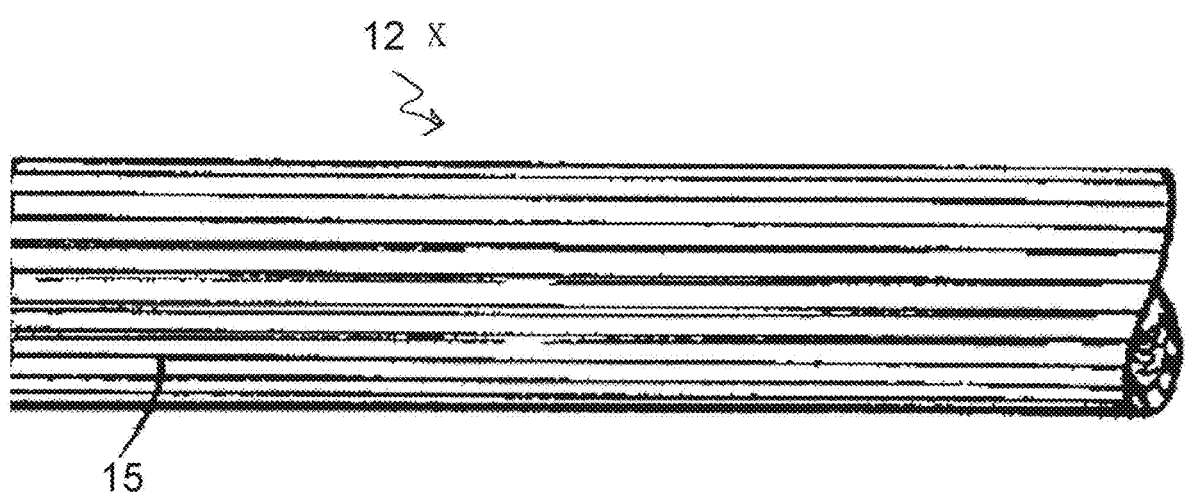
FIG. 14 is a perspective view of an inner fluid conductor according to an example of the present disclosure.

In another example, shown in FIG. 14, inner fluid conductor 12X has one or more raised longitudinal ribs 15 thereon. Ribs 15 may be formed integrally with inner fluid conductor 12X, or may be affixed thereto, and run lengthwise along the outer surface of inner fluid conductor 12X. Ribs 15 maintain a spacing between inner fluid conductor 12X and outer jacket 14 over at least a portion of the outer surface of inner fluid conductor 12X. Inner fluid conductor 12X and outer jacket 14 are unconnected along their lengths and are free to move with respect to each other, and thus there is substantial contact between these components during stretching, elongating and contracting of inner fluid conductor 12X. The spacing by ribs 15 helps to reduce friction between inner fluid conductor 12X and outer jacket 14 by decreasing the areas of contact between these components. This reduction in friction assists in reducing wear and maintaining durability of inner fluid conductor 12X, particularly in comparison with a similar inner fluid conductor that has no raised ribs. Ribs 15 also structurally enhance the strength and durability of inner fluid conductor 12X.

The inner fluid conductor 12X may be made of an elastomer material such as, for example, silicone rubber, Viton® (E. I. Du Pont De Nemours And Company, Wilmington, Delaware), thermoplastic elastomer, latex rubber, gum rubber or nitrile rubber.

In one embodiment, the inner fluid conductor 12X may be made of a material in which activated charcoal powder is infused in Acrylonitrile butadiene styrene (ABS). ABS is approved for potable water systems is a common thermoplastic polymer typically used for injection molding applications or for 3D printing.

Other thermoplastic polymers or plastics in which activated charcoal powder can be infused may alternatively be used.

As another example, the inner fluid conductor may be formed with activated charcoal fabric (ACC), that is, activated charcoal powder infused in fabric. It has been found that ACC has odor adsorbing properties superior to that of charcoal granules.

In one embodiment, an inner surface 18 of the fluid conductor may be infused with activated charcoal (see FIGS. 1-2). As water flows in a flow direction substantially tangential to the inner surface 18, the charcoal infused surface may adsorb one or more undesirable components in the water. The entire inner surface 18 of the fluid conductor may be charcoal-infused, or just a portion of the inner surface 18 may be infused with charcoal.

The outer jacket 14 is not limited to any specific material and may include, for example, fabric or plastic. Relative to the inner fluid conductor 12X, the outer jacket 14 may be less stretchable in a radial direction. However, the outer jacket 14 may be configured to stretch axially by a substantial distance. As one example, outer jacket 14 may include a "tube" of fabric (woven as such or sewn into a tube shape, for example), which is bunched up around the inner fluid conductor 12X when the hose 10 is in a retracted state and is fully or near fully unbunched when the hose 10 is in an elongated state. As another example, outer jacket 14 may be a molded plastic accordion bellows.

When a pressurized fluid 16 is introduced into an inner surface 18 of the inner fluid conductor 12X, a force exerted by the pressurized fluid 16 onto the inner surface 18 acts to stretch the inner fluid conductor's circumference radially outward. The inner fluid conductor 12X enlarges radially as long as the pressure of the fluid is sufficient to overcome the resistance to stretching of the material of the inner fluid conductor 12X. An inner fluid conductor 12X made of a stiffer material, for example, will exhibit less stretching than an inner fluid conductor made of a softer material when a fluid having the same pressure is introduced into both conductors. Eventually, the inner fluid conductor 12X stretches radially outward enough so that it receives resistance to further outward stretching from the outer jacket 14. The outer jacket 14 may be configured so as not to allow circumferential stretching of the inner fluid conductor 12X beyond a predetermined amount.

At the same time that the circumference of the inner fluid conductor 12X stretches outwardly, the inner fluid conductor 12X may also stretch in an axial direction. When the outer jacket 14 restricts further circumferential stretching of the inner fluid conductor 12X, the pressure of the fluid 16 on the inner surface 18 acts to stretch the inner fluid conductor 12X in an axial direction.

Figure 3:
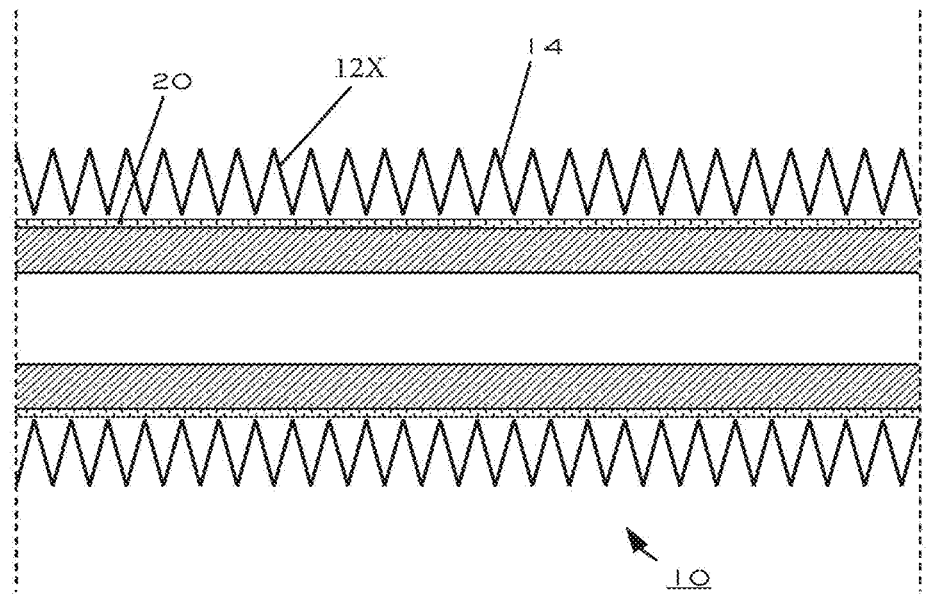
FIG. 3 is a cross sectional view of a hose according in a retracted state according to another example of an embodiment of the present disclosure.
Figure 4:
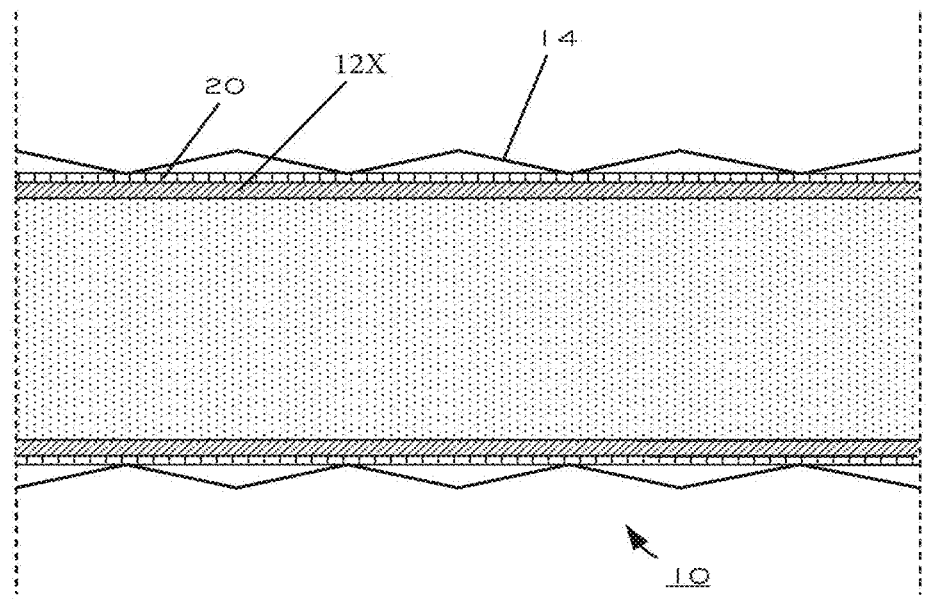
FIG. 4 is a cross sectional view of a hose in an elongated state according to the example of FIG. 3.

During the stretching, elongating and retracting of the inner fluid conductor 12X and outer jacket, there is substantial contact and friction between these components. In another example, shown in FIGS. 3 and 4, a lubricant 20 may be introduced between the inner fluid conductor 12X and the outer jacket 14 to reduce friction between these components. The material choice of the lubricant 20 is not limited and may include solid, liquid or paste-like lubricants. In one example, the lubricant 20 is a powdered or spray-on silicone-based lubricant. In addition, a lubricant may provide benefits during manufacture of the hose such as allowing the outer jacket 14 to be fitted around the inner fluid conductor 12X with less friction.

Figure 5:
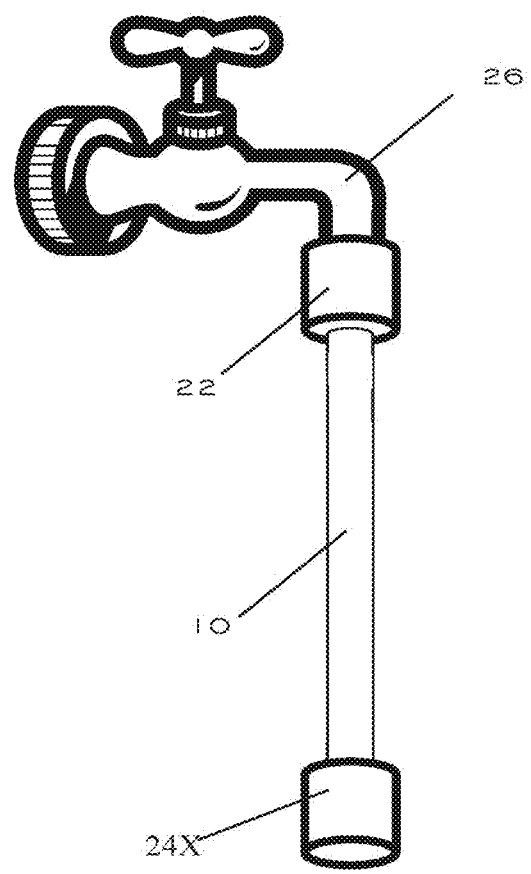
FIG. 5 is a notional view of a garden hose according to another example of the present disclosure.

In one example, shown in FIG. 5, a garden hose includes an elongatable and retractable hose 10 according to the description above and hose fittings 22 and 24X at either end. One of the hose fittings 22 is connected to a spigot 26. The other hose fitting 24X may be provided with a valve to close the end of the hose. Alternatively, or in addition, a separate device may be attached to hose fitting 24X. For example, a sprayer or nozzle head may be threaded onto hose fitting 24X. The hose fitting 24X is an example of a connector that couples the hose to a sprayer or nozzle head.

In another example, a valve, such as valve 28, shown in FIGS. 9A-9F, may be attached to hose fitting 24X. When the spigot 26 is opened with the other end of the hose 10 closed (either by a valve in hose fitting 24X or by another attached device), the pressure of the water introduced into the hose 10 from the spigot 26 causes the hose 10 to elongate. The hose 10 will retain its elongated state as long as the pressure is maintained. When a user is through using the garden hose, he can close the spigot 26, open the end of the hose 10 to let the water drain out of the hose, and let the hose 10 retract as the inner fluid conductor 12X contracts back to its unpressurized state.

Figure 6A:
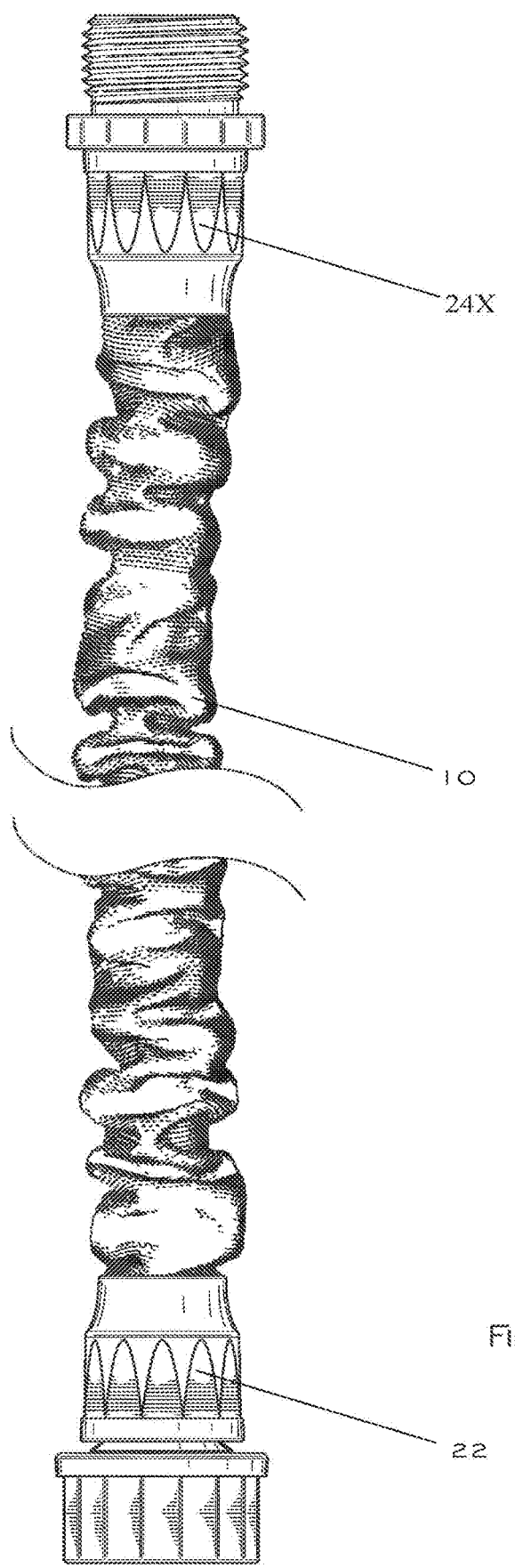
FIGS. 6A-6C are side, top and bottom views, respectively of a hose terminated by hose fittings (e.g., hose connector), according to another example of the present disclosure.
Figure 6B:
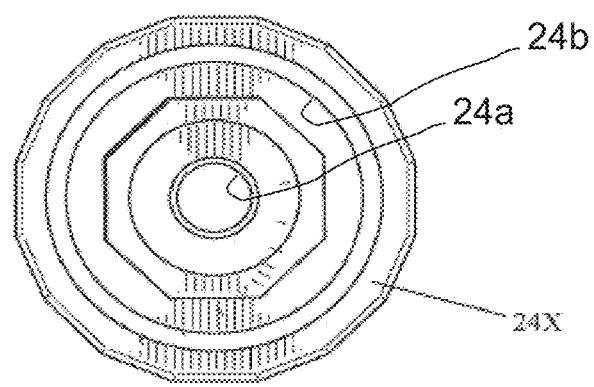
Figure 6C:
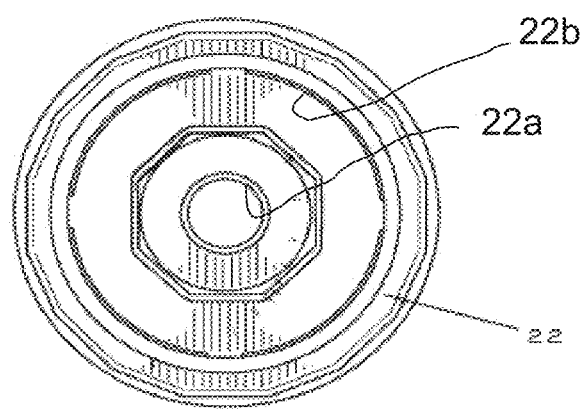
Figure 7A:
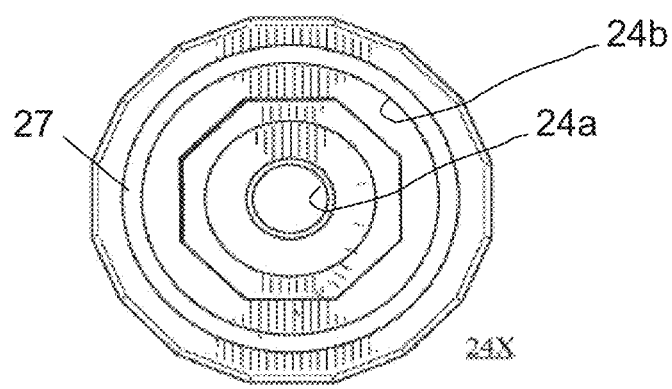
FIGS. 7A-7C are right side, front side and left side views, respectively, of a hose fitting according to another example of the present disclosure.
Figure 7B:
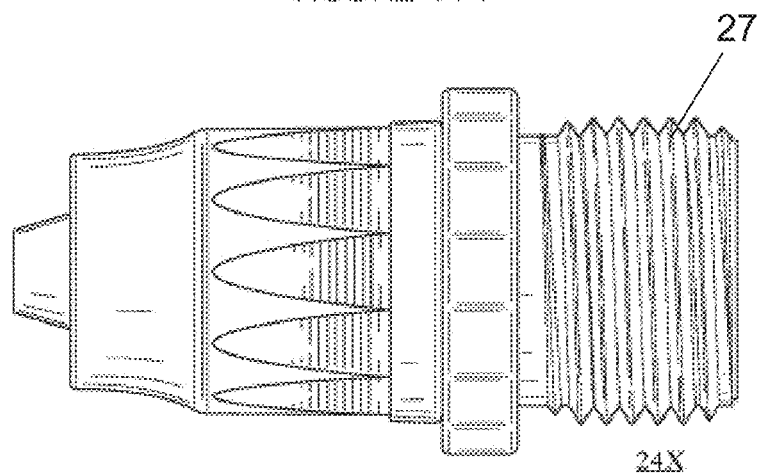
Figure 7C:
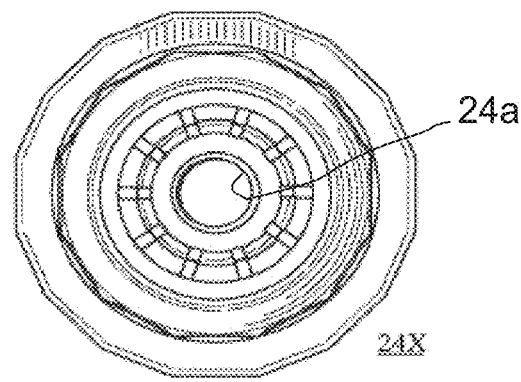

Various examples of hoses and fittings (also referred to herein as "connector") are shown in FIGS. 6A-9F. For example, FIGS. 6A-6C are side, top and bottom views, respectively of a hose 10 terminated by hose fittings 22 and 24X, the sectioned hose showing indeterminate length thereof. As another example, FIGS. 7A-7C are right side, front side and left side views, respectively, of a hose fitting 24X with a male thread 27. An inner or water-contacting surface or a portion thereof of hose fitting 24X may be infused with activated-charcoal such that when water passes through the fitting 24X, the charcoal-infused surface may adsorb one or more undesirable components in the water flowing in the flow direction substantially tangential to the water-contacting surface of the fitting. As a non-limiting example, surfaces 24a and/or 24b, or portions thereof, may be infused with activated charcoal.

Figure 8A:
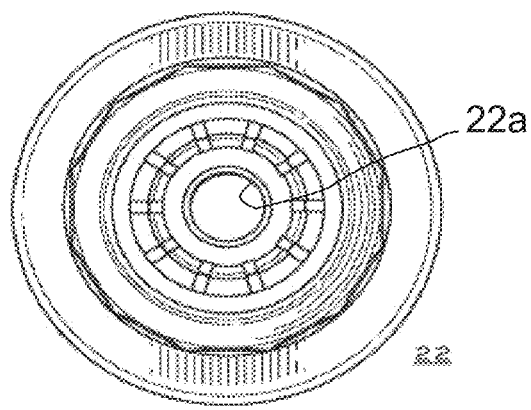
FIGS. 8A-8C are right side, front side and left side views, respectively, of a hose fitting according to another example of the present disclosure.
Figure 8B:
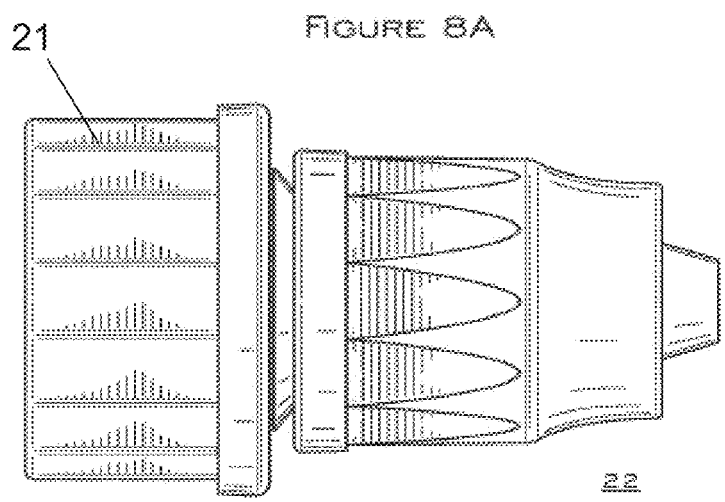
Figure 8C:
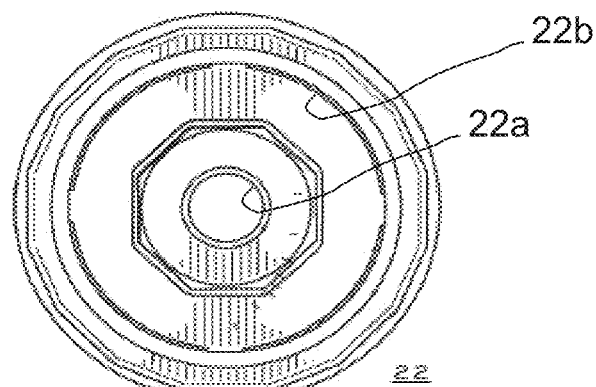
Figure 9A:
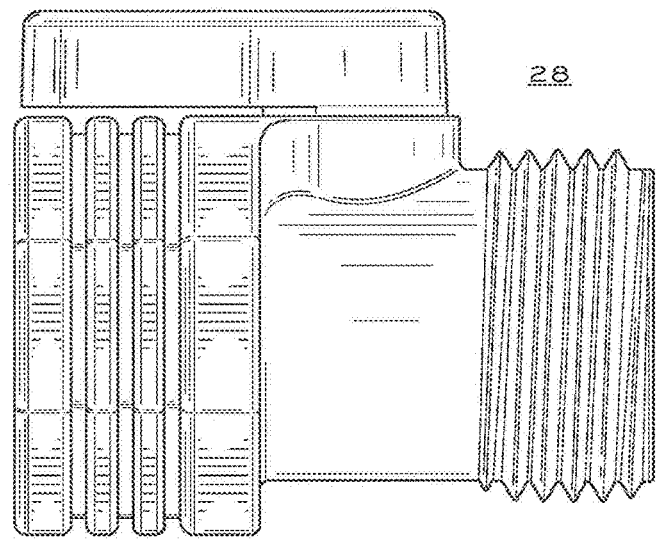
FIGS. 9A-9F are front side, top, rear side, bottom, right side and left side views, respectively, of a valve according to another example of the present disclosure.
Figure 9B:
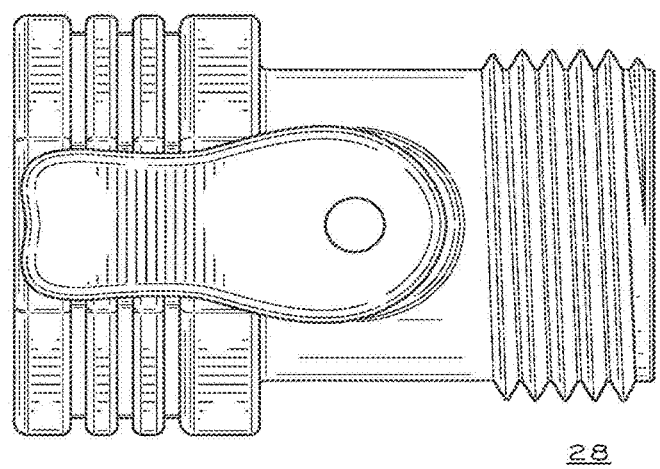
Figure 9C:
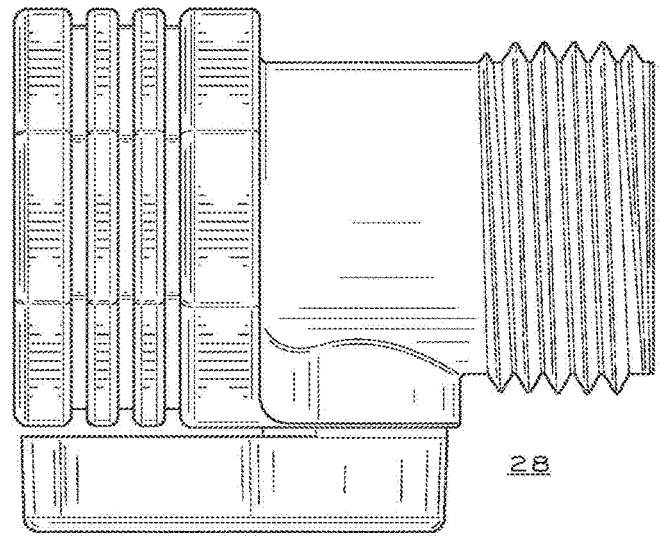
Figure 9D:
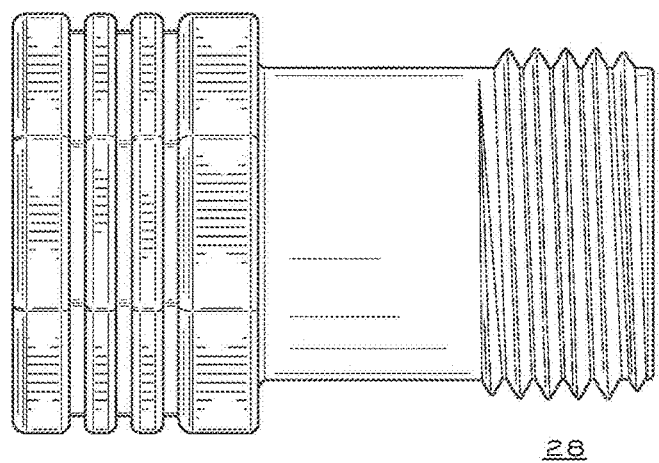
Figure 9E:
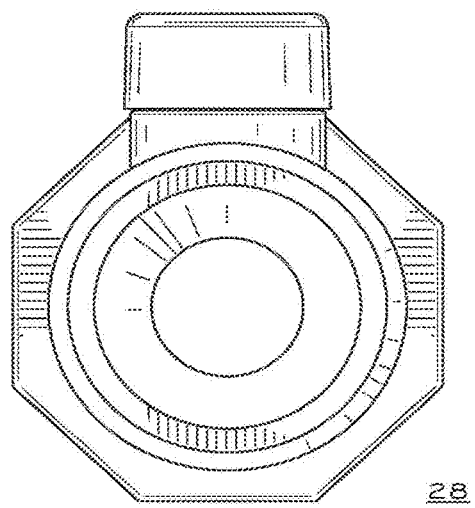
Figure 9F:
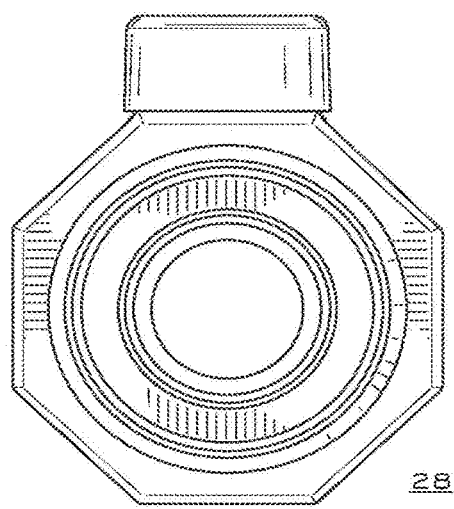

As yet another example, FIGS. 8A-8C are right side, front side and left side views, respectively, of a hose fitting 22 with a female thread 21. An inner or water-contacting surface or a portion thereof of hose fitting 22 may be infused with activated-charcoal such that when water passes through the fitting 22, the charcoal-infused surface may adsorb one or more undesirable components in the water flowing in the flow direction substantially tangential to the water-contacting surface of the fitting. As a non-limiting example, surfaces 22a and/or 22b, or portions thereof, may be infused with activated charcoal. As still another example, FIGS. 9A-9F are front side, top, rear side, bottom, right side and left side views, respectively, of a valve 28 which may be attached to hose fitting 24X.

In another example, a hose 10 is attached to a hose fitting 22 or 24X by a barbed connection secured by a crimp ring 30. In the example shown in FIG. 10, a hose fitting 24X includes a fitting body 32 and a cover 34. Cover 34 is configured to fit over top of crimp ring 30 and engage fitting body 32. In the example shown, fitting body 32 engages cover 34 by a threaded connection. FIG. 11 shows a partial cross-sectional view of the barbed connection shown in FIG. 10 taken along a plane parallel to a major axis of the hose. As shown in FIG. 11, the inner fluid conductor 12X and outer jacket are fitted about a barbed portion 36 of fitting 24X. The barbed portion 36 includes one or more barbs 38 extending from an outer surface thereof which impinge the inner fluid conductor 12X. A crimp ring 30 is fitted over the outer jacket 14 in an area of the barbs and crimped, i.e., deformed so as to reduce an inner dimension thereof. Accordingly, the crimp ring compresses the inner fluid conductor 12X and outer jacket 14 to the barb(s) 38, improving the security of the hose's connection to the fitting body 24X. In some embodiments, at least a portion of an inner surface 37 or water contacting surface of barbed portion 36 may be infused with activated charcoal to convey an adsorption property to adsorb one or more undesirable components which are not conducive to wellness of a consumer who drinks the water containing said undesirable components.

Figure 10:
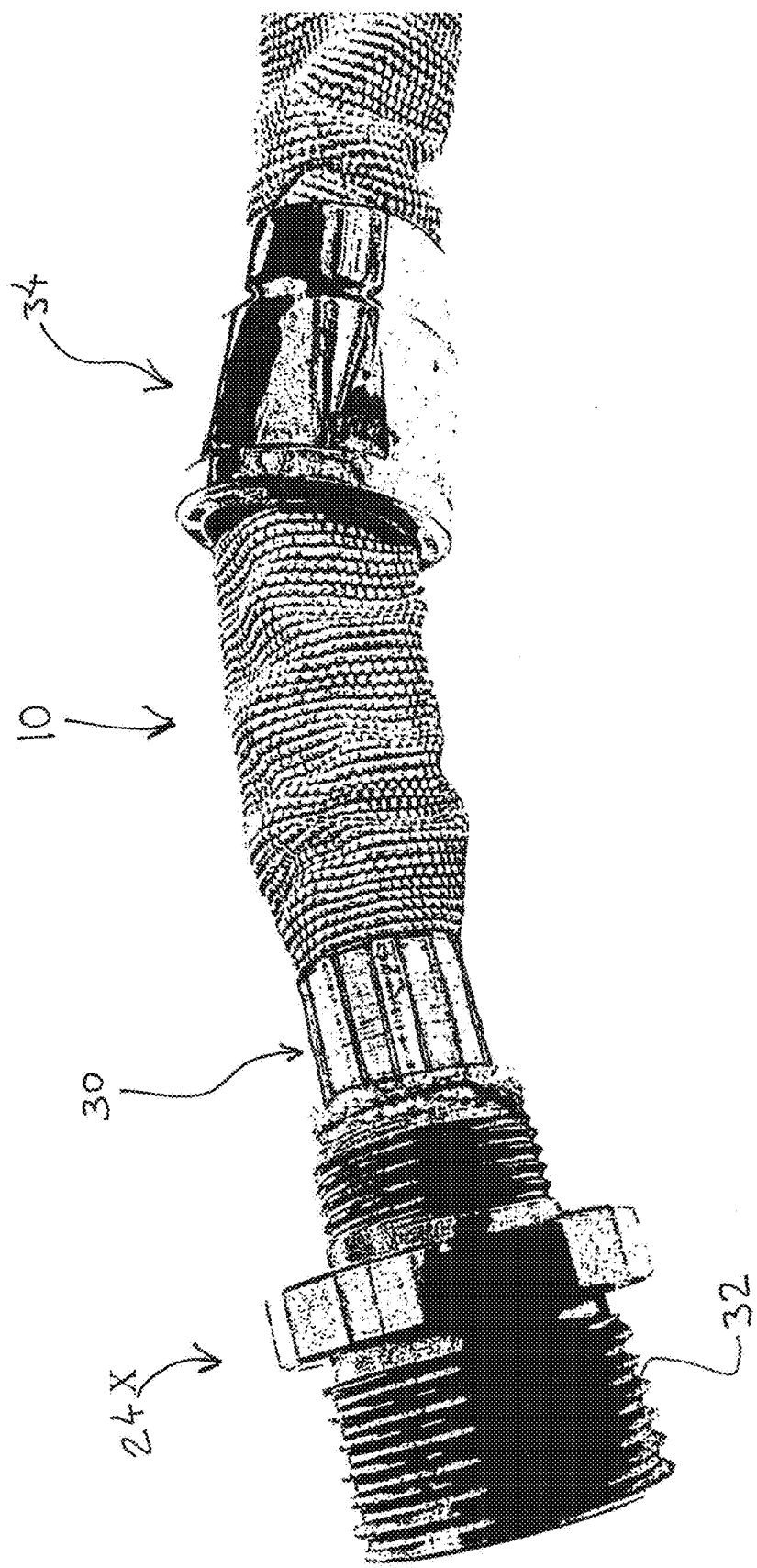
FIG. 10 is a perspective view of a hose and hose fitting according to another example of the present disclosure.
Figure 11:
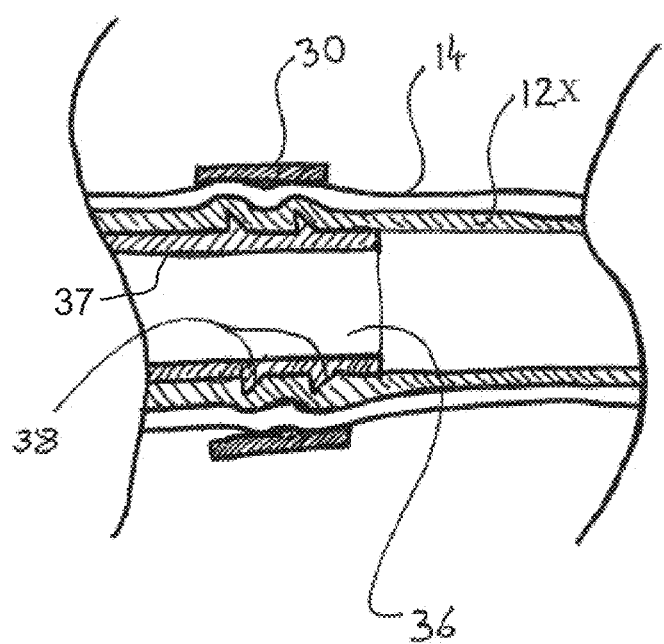
FIG. 11 is a partial cross-sectional view of the barbed connection shown in FIG. 10 taken along a plane parallel to a major axis of the hose.
Figure 12:
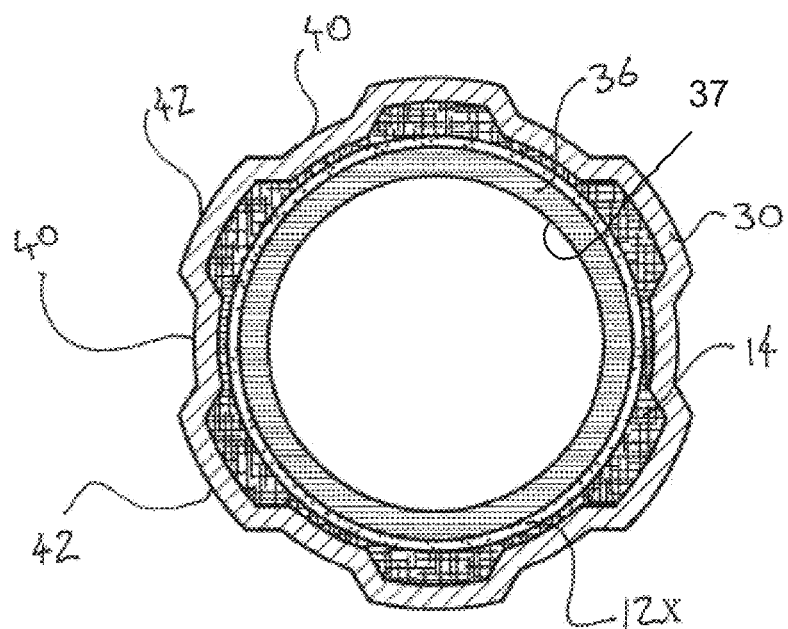
FIG. 12 is a cross sectional view of the barbed connection shown in FIG. 10 taken along a plane perpendicular to a major axis of the hose 10.
Figure 13:
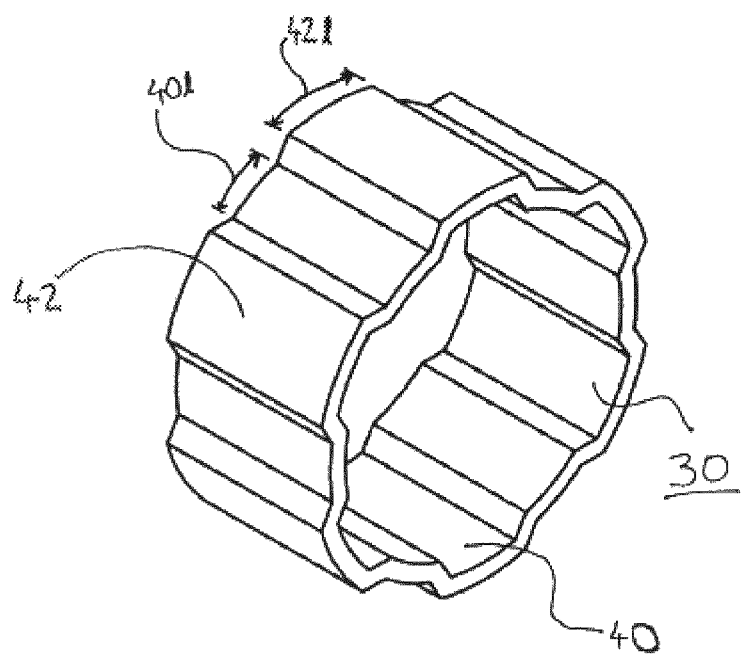
FIG. 13 is a perspective view of a crimp ring according to another example of the present disclosure.

In one example, shown in FIG. 10, the crimped crimp ring 30 has a deformed shape around its entire circumference. FIG. 12 is a cross sectional view of the barbed connection shown in FIG. 10 taken along a plane perpendicular to a major axis of the hose 10 and also shows the deformation of crimp ring 30 extending around its entire circumference. A crimped crimp ring 30 is shown by itself in FIG. 13. In the example shown, a crimp ring may be configured with one or more troughs 40 and one or more peaks 42. For example, a crimp ring may be configured with four or more peaks 42 and four or more peaks distributed around its circumference. A circumferential length 40L of trough 40 may be configured equal to, less than, or more than a circumferential length 42L of an adjacent peak 42. In one particular example, circumferential peak lengths 42L for peaks 42 are less than circumferential trough lengths 40L of troughs 40 included on a crimp ring 30 having a plurality of peaks 42 and troughs 40.

The fitting or connector 22 and 24X in the examples discussed herein may be constituted by a material in which activated charcoal powder is infused in Acrylonitrile butadiene styrene (ABS) or another thermoplastic polymer or plastic which permits the connector to be readily formed, for example, by injection molding or by 3D printing. The activated charcoal may be infused to a portion of an inner surface or water-contacting surface of the connectors 22 and 24X.

Other materials may be used, with or without, activated charcoal powder having effectively been infused therein.

Figure 15A:
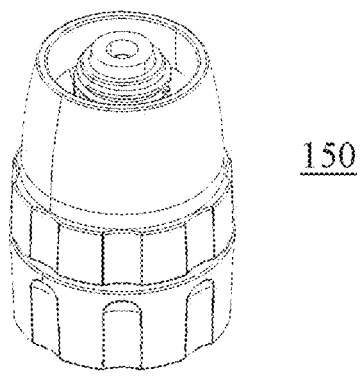
FIGS. 15A and 15B are perspective views of a nozzle head unconnected and connected to a hose section, respectively, in an example of an embodiment of the present disclosure.
Figure 15B:
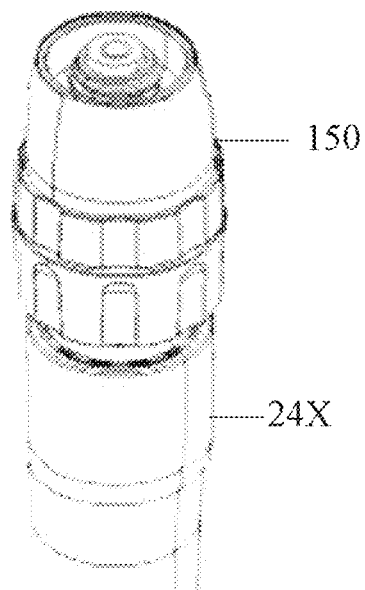
Figure 15B:
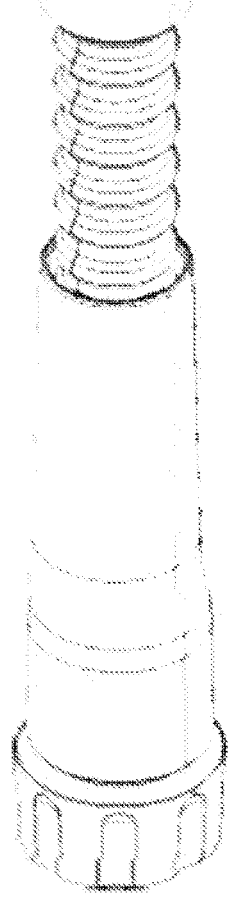

As mentioned elsewhere herein, a material forming a nozzle or a section of the sprayer or nozzle head which is furthest downstream in the fluid path before it is ejected from the nozzle may be infused with activated charcoal powder such that the water-contacting surface would have the adsorption property to adsorb undesirable components in the water flowing substantially tangentially to the water-contacting surface. Such a nozzle head 150 is shown unconnected in FIG. 15A and connected to a hose section via 24X in FIG. 15B.

Figure 16:
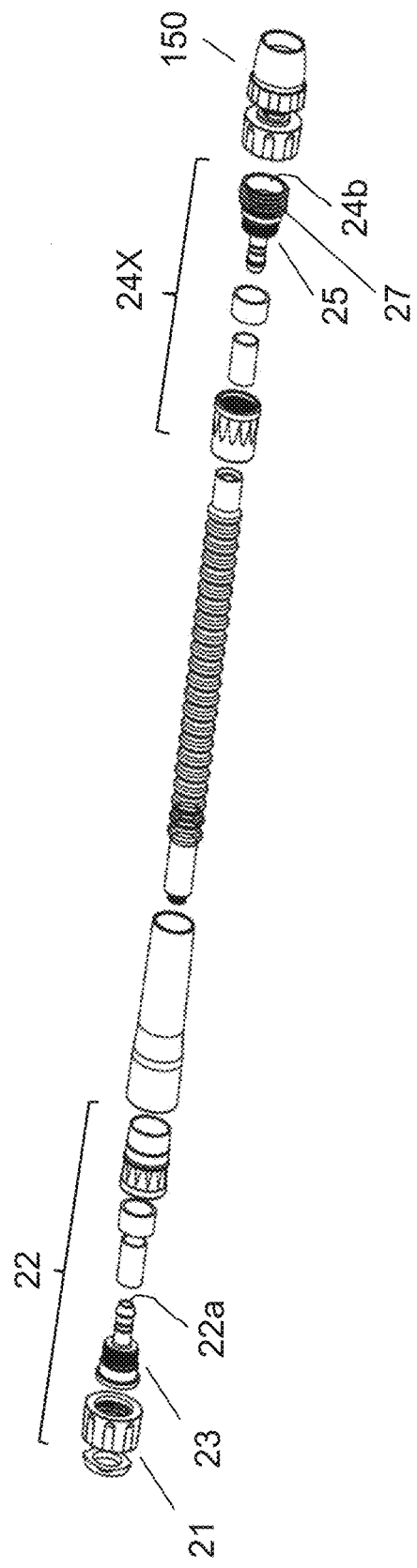
FIG. 16 is a perspective view of a hose terminated by hose fittings (e.g., hose connector), according to another example of the present disclosure.

FIG. 16 shows an exploded perspective view of an embodiment of a hose attached to and between connectors 22 and 24X. As shown, connector 22 may include a female thread 21 which may attach to a spigot or water source. The connector 22 may be formed of several components, including a connector piece 23. The connector piece 23 may be made of a material (e.g., plastic) infused with activated charcoal. An inner surface or water-contacting surface of connector piece 23 may be infused with activated charcoal. In some embodiments, a portion of the inner surface may be infused with activated charcoal. For example, a portion along inner surface 22a may be infused with activated charcoal such that when water passes through inner surface 22a, the charcoal-surface may adsorb one or more undesirable components in the water flowing in the flow direction substantially tangential to the water-contacting surface of the inner fluid conductor. It should be noted that any inner surface or water-contacting surface of connector 22 may have a portion infused with activated-charcoal.

As shown in FIG. 16, connector 24 may include a male thread 27 which may attach to a nozzle 150 or other sprayer or valve. The connector 24X may be formed of several components, including a connector piece 25. The connector 24X may be made of a material (e.g., plastic) infused with activated charcoal. An inner surface or water-contacting surface of connector piece 25 may be infused with activated charcoal. In some embodiments, a portion of the inner surface may be infused with activated charcoal. For example, a portion along inner surface 24b may be infused with activated charcoal such that when water passes through inner surface 24b, the charcoal-surface may adsorb one or more undesirable components in the water flowing in the flow direction substantially tangential to the water-contacting surface of the inner fluid conductor. It should be noted that any inner surface or water-contacting surface of connector 24X may have a portion infused with activated-charcoal.

In addition, the embodiments and examples discussed herein are illustrative, and many variations can be introduced to them without departing from the spirit of the disclosure or from the scope of the appended claims. For example, elements and/or features of different illustrative examples and exemplary embodiments herein may be combined with each other and/or substituted for each other within the scope of this disclosure.

Although specific advantages have been enumerated above, various embodiments may include some, none, or all of the enumerated advantages.

Other technical advantages may become readily apparent to one of ordinary skill in the art after review of the following figures and description. It should be understood at the outset that, although examples are illustrated in the figures and described below, the principles of the present disclosure may be implemented using any number of techniques, whether currently known or not. The present disclosure should in no way be limited to the implementations and techniques illustrated in the drawings and described herein.

Unless otherwise specifically noted, articles depicted in the drawings are not necessarily drawn to scale.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. A garden hose with a nozzle comprising:
   a fluid conductor having an inner water-contacting surface along which water flows in a flow direction substantially tangential to said surface;

a first hose connector to fluidly connect the fluid conductor to the nozzle via a male thread on the first hose connector sized and configured to attach to a female thread on the nozzle through which the water is ejected from the garden hose, the first hose connector and the nozzle each having at least one water-contacting surface; and a second hose connector to fluidly connect the fluid conductor to a spigot via a female thread on the second hose connector sized and configured to attach to a male thread on the spigot through which the water enters the garden hose, wherein at least a portion of one of (i) the inner water-contacting surface of the fluid conductor, (ii) the water-contacting surface of the first hose connector, and (iii) the water-contacting surface of the nozzle is infused with activated charcoal powder to convey, to the charcoal infused water-contacting surface, an adsorption property to adsorb one or more undesirable components which are not conducive to wellness of a consumer who drinks the water containing said undesirable components.

2. The garden hose of claim 1, wherein the fluid conductor comprises (a) an inner fluid conductor having a tubular form and an inner surface that is in contact with the water, when the water is flowing through the inner fluid conductor, and (b) an outer jacket disposed around the inner fluid conductor, and the inner fluid conductor is formed of a material in which activated charcoal powder is infused therein, the activated charcoal powder being disposed in the inner fluid conductor to convey, to the water-contacting surface of the inner fluid conductor, the adsorption property to adsorb said one or more undesirable components in the water flowing in the flow direction substantially tangential to the water-contacting surface of the inner fluid conductor.

3. The garden hose of claim 2, wherein the inner fluid conductor through which the water flows is formed of a fabric in which activated charcoal powder is infused, and the fabric in which activated charcoal powder is infused has the adsorption property to adsorb said one or more undesirable components in the water flowing in the flow direction substantially tangential to the water-contacting surface of the inner fluid conductor.

4. The garden hose of claim 2, wherein the inner fluid conductor through which the water flows is formed of a plastic material in which activated charcoal powder is infused, and the activated charcoal powder is disposed in the inner fluid conductor to convey, to the water-contacting surface of the inner fluid conductor, the adsorption property to adsorb said one or more undesirable components in the water flowing in the flow direction substantially tangential to the water-contacting surface of the inner fluid conductor.

5. The garden hose of claim 1, wherein the first hose connector is formed of a plastic material in which activated charcoal powder is infused, and the activated charcoal powder is disposed in the first hose connector to convey, to the water-contacting surface of the first hose connector, the adsorption property to adsorb said one or more undesirable components in the water flowing in the flow direction substantially tangential to the water-contacting surface of the first hose connector.

6. The garden hose of claim 1, wherein the first hose connector includes plural sections and at least a connector section amongst the plural sections includes a water-contacting surface and is formed of a plastic material in which activated charcoal powder is infused, and the activated charcoal powder is disposed in the connector section to convey, to the water-contacting surface of the connector section, the adsorption property to adsorb said one or more undesirable components in the water flowing in the flow direction substantially tangential to the water-contacting surface of the connector section.

7. The garden hose of claim 1, wherein the nozzle is formed of a plastic material in which activated charcoal powder is infused, and the activated charcoal powder is disposed in the nozzle to convey, to the water-contacting surface of the nozzle, the adsorption property to adsorb said one or more undesirable components in the water flowing in the flow direction substantially tangential to the water-contacting surface of the nozzle.

8. The garden hose of claim 1, wherein the nozzle includes plural sections and at least a nozzle section amongst the plural sections includes a water-contacting surface and is formed of a plastic material in which activated charcoal powder is infused, and the activated charcoal powder is disposed in the nozzle section to convey, to the water-contacting surface of the nozzle section, the adsorption property to adsorb said one or more undesirable components in the water flowing in the flow direction substantially tangential to the water-contacting surface of the nozzle section.

* * * * *